(12) United States Patent
Lei

(10) Patent No.: US 10,200,333 B1
(45) Date of Patent: Feb. 5, 2019

(54) VIRTUAL BULLETIN BOARD SYSTEM

(71) Applicant: Amazon Technologies, Inc., Seattle, WA (US)

(72) Inventor: Nyomi Lei, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 14/968,438

(22) Filed: Dec. 14, 2015

(51) Int. Cl.
*H04L 12/58* (2006.01)
*G06F 17/30* (2006.01)

(52) U.S. Cl.
CPC ........ *H04L 51/24* (2013.01); *G06F 17/30876* (2013.01)

(58) Field of Classification Search
None
See application file for complete search history.

(56) References Cited

U.S. PATENT DOCUMENTS

| | | | | |
|---|---|---|---|---|
| 2006/0053194 | A1* | 3/2006 | Schneider | H04L 12/1827 709/204 |
| 2011/0093805 | A1* | 4/2011 | Ekhager | G06Q 10/10 715/769 |
| 2013/0290855 | A1* | 10/2013 | Ashcraft | G06F 3/0486 715/738 |
| 2014/0108567 | A1* | 4/2014 | Borger | H04L 51/32 709/206 |
| 2014/0214982 | A1* | 7/2014 | Koch | G06Q 10/10 709/206 |
| 2015/0286790 | A1* | 10/2015 | Ahmad | G06F 17/2705 705/2 |
| 2016/0306384 | A1* | 10/2016 | Carvey | G06F 1/1632 |

* cited by examiner

*Primary Examiner* — Philip J Chea
*Assistant Examiner* — Hassan A Khan
(74) *Attorney, Agent, or Firm* — Lee & Hayes, P.C.

(57) ABSTRACT

A virtual bulletin board system (10) has a display (14) to present a visual announcement and/or a speaker (16) to present an audible announcement, and a sensor (18) to read badge identification information from a badge (22) presented to the sensor by a user (24). The system relates the badge identification number to an email address or a text message address, such as the email address of the user of the badge or the telephone number of the user, and sends information regarding the announcement, or a calendar entry for the announcement, to that address. Multiple announcements may be presented and each announcement may correlated with the timing that a badge is presented so that the desired announcement information is sent to the user.

20 Claims, 7 Drawing Sheets

VIRTUAL BULLETIN BOARD SYSTEM

BACKGROUND

Bulletin boards of all types surround us. There are the traditional wood bulletin boards where one posts a notice with paper and a thumbtack, and there are electronic bulletin boards that parade an endless sequence of announcements, such as may be in the front lobby or entrance area in an office or building, or on a screen in an elevator. A problem with such bulletin boards is that the viewer (also sometimes referred to herein as the "user") must write down the information or try to remember the information regarding the announcement so that the user can put it on a calendar later. But, by the time the user gets home, the user may have forgotten many of the details, such as the exact time and/or the exact location. Further, if the user has experienced a hectic day or heavy traffic since viewing the announcement, the user may have even forgotten about the announcement entirely. Some viewers take a picture of the announcement with, for example, a camera built into their cellular telephone or other personal electronic device but, even then, a viewer must remember that he or she has taken such a picture, and then put it on his or her calendar.

DETAILED DESCRIPTION

The following detailed description is directed to concepts and technologies for a virtual bulletin board system. Briefly stated, a bulletin board presents a visual and/or audible announcement, a user sees or hears the announcement, steps up to or near the bulletin board, and presents the user's badge to the bulletin board, such as by placing the user's badge on or near a sensor for scanning or "swiping" the user's badge on a card reader. The badge has an identification number, and possibly other information, such as a photograph, the badge holder's name, etc. A sensor reads the identification information from the badge, such as a badge identification number, an employee identification number, or other identification code. The system determines a virtual address corresponding to the identification information, such as by accessing a database. A virtual address, as used herein, is something other than a physical street address, and is an address by which information may be sent electronically. A virtual address may be, by way of example and not of limitation, an email address, such as the email address of the user of the badge, a telephone number of the user, such as for sending a text message, such as an SMS message, to the user, a Twitter™ address, a Facebook™ address, or some other type of electronic address. Thus, a user may have more than one virtual address. The system then sends information regarding the announcement to a virtual address, such as by sending information regarding the announcement as a text message, sending information regarding the announcement as an email message, and/or sending an email message with a calendar entry for the announcement. The user is therefore relieved of the chore of trying to remember the announcement or details regarding the announcement. Further, if a calendar entry is sent, it may be automatically or manually entered into the user's calendar.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
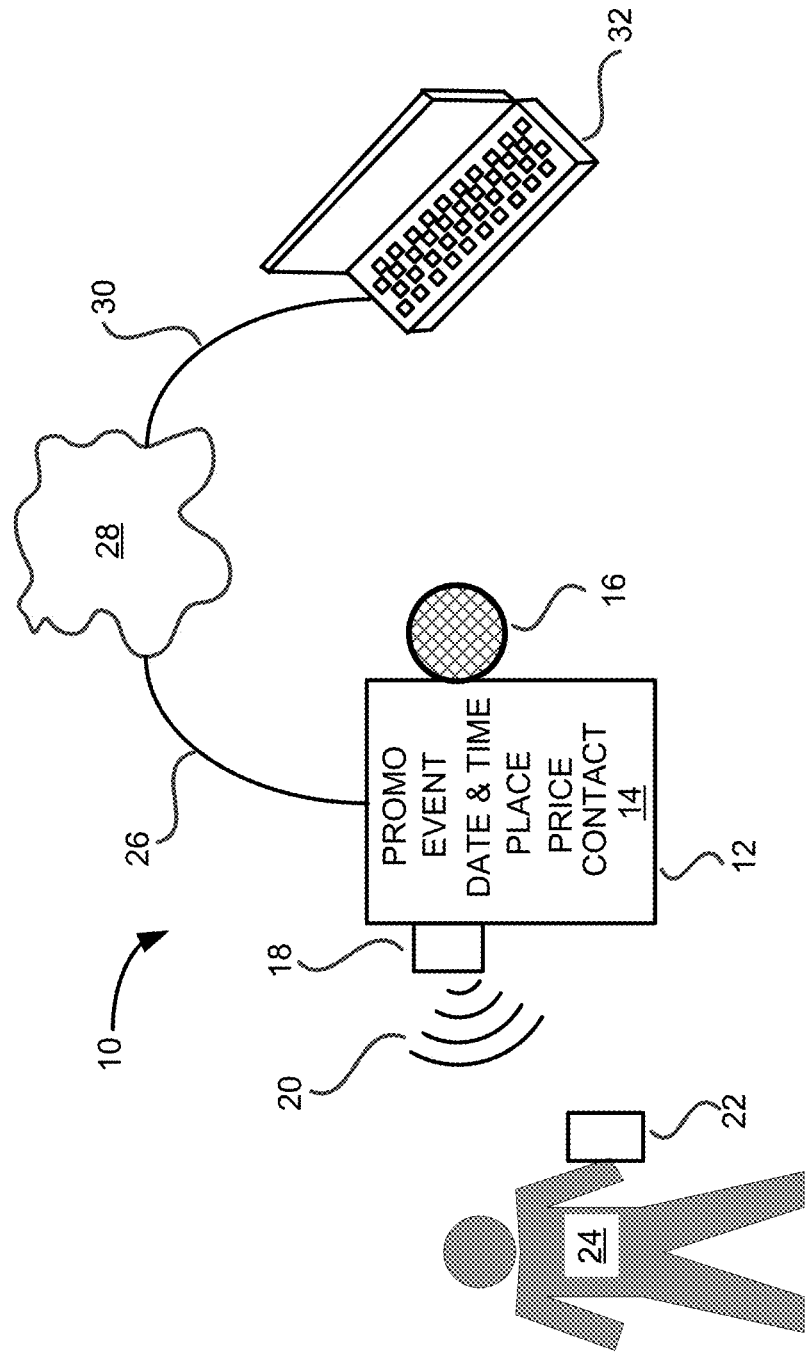
FIG. 1 is a block diagram of one exemplary embodiment of a virtual bulletin board system.

FIG. 1 is a block diagram of one exemplary embodiment of a virtual bulletin board system (VBBS) 10. The exemplary VBBS 10 comprises a virtual bulletin board 12 which has a display 14 and/or a speaker 16, and a sensor 18. The display 14, if used, presents a visual display of an announcement, such as a PROMO to attract the user's attention, e.g., "Can You Afford To Retire?", an EVENT name or title, e.g., "Retirement Planning Seminar", a DATE and TIME, e.g., February 10 at 10:00 AM, a place, e.g., Room 215A, PRICE information, e.g., "FREE!", and CONTACT information, e.g., "Call CLW at extension 1916." Of course, more information, or less information, may be provided on the display 14, as desired and as appropriate for a particular announcement.

The speaker 16 may provide the announcement in an audible form to provide information in addition to that presented visually, and/or to present the announcement to persons who are visually impaired. Although only one speaker 16 is shown, there may be multiple speakers 16 so as to provide for a stereophonic sound delivery, or to allow for more people to hear the sound without having an excessively high volume level in front of any speaker 16.

The sensor 18 reads information from the badge 22 of a user 24. The term "badge", as used herein, is not limited to the laminated card often carried by a user as a means of identification but includes anything which may be read by a sensor to obtain information about the badge holder. For example, the badge 22 may be a radio frequency identification (RFID) card, as suggested by the radio waves 20, in which case the sensor 18 would be an RFID reader or a near-field communication sensor (another type of RFID sensor). The badge 22 may also be a card having a bar code, a Quick Read (QR) code, or some other optically-readable code, in which case the sensor 18 might be an optical scanner. The badge 22 may also be an EMV card having a computer chip thereon, in which case the sensor 18 might be a slot for insertion of the EMV card. The badge 22 may also be, for example, a smart phone or other device which can display a bar code, QR code, or other optically-readable code. The sensor 18 may also be a biometric scanner, such as but not limited to a fingerprint scanner, in which case the "badge" would be the user's finger, or a facial recognition system, in which case the "badge" would be the user's face, in which case the user's fingerprint or face would have been registered with the system.

When the user 24 approaches the virtual bulletin board 12 and sees and/or hears an announcement of interest then the user will take his or her badge 22 and present it to the sensor 18 for reading. The sensor 18 will read the badge 22 to determine the identification information of the badge 22. A processor (e.g., #202 in FIG. 2) can use that identification information to consult a database (e.g., #208A and/or 208B in FIG. 2) to determine a virtual address registered for the user 24, such as but not limited to an email address, and to send an email message to the user at that email address via, for example, communication links 26 and 30 and a network 28, such as but not limited to the Internet. The processor may also cause a light (not shown) or the display to flash, the speaker 16 or another device to present a sound, such as a beep, or cause an indication to appear on the display 14 (e.g., "A message has been sent to you."), so as to notify the user that the badge has been successfully read. The email message may be, for example, a calendar entry and/or information related to the announcement. When the user 24 returns to his or her home or office, the email message will be waiting on the user's computer 32. The user can then accept the calendar entry, in which case at least some information regarding the announcement will be on the user's computer, or the user can read the information in the email message and generate his or her own calendar entry. Thus, the user has not had to remember the details of the announcement, or even remember that the user had seen and/or heard the announcement. This provides a great convenience for the user and also eliminates mistakes (e.g., the date, time, place, etc.) which may have otherwise been created by the user relying upon memory.

Communication may be via the Internet, as mentioned above, or may be partially or completely via another network 28. For example, if the virtual bulletin board system 10 is intended solely for internal company use, then the communication links 26 and 30 and the network 28 may be part of an office Intranet system.

The VBBS may also be used in other environments. For example, the badge could be the room key or room card of a person staying at a hotel. When the viewer sees an announcement of interest the user can present his room key or card to the VBBS. The system would then read the identification information from that room key or card and send information regarding the announcement to, for example, the TV in the user's hotel room so that when the user turned on the TV the announcement information of interest to the user would be presented, preferably but not necessarily before any other, standard announcements that the hotel may present on the TV to the user. Thus, in this case, the virtual address corresponding to the identification information for the badge is the electronic address of the TV.

As another example, the VBBS may be used with a mass transit system. The bus or train will have display panels 14 and/or speakers 16 in the bus or train car, and will have one or more sensors 18 in the bus or train car. Then, when the user sees or hears an announcement of interest, the user can present his or her mass transit system fare card. The system will read the identification information from the fare card and send information regarding the announcement to one or more virtual addresses registered by the user.

Figure 2:
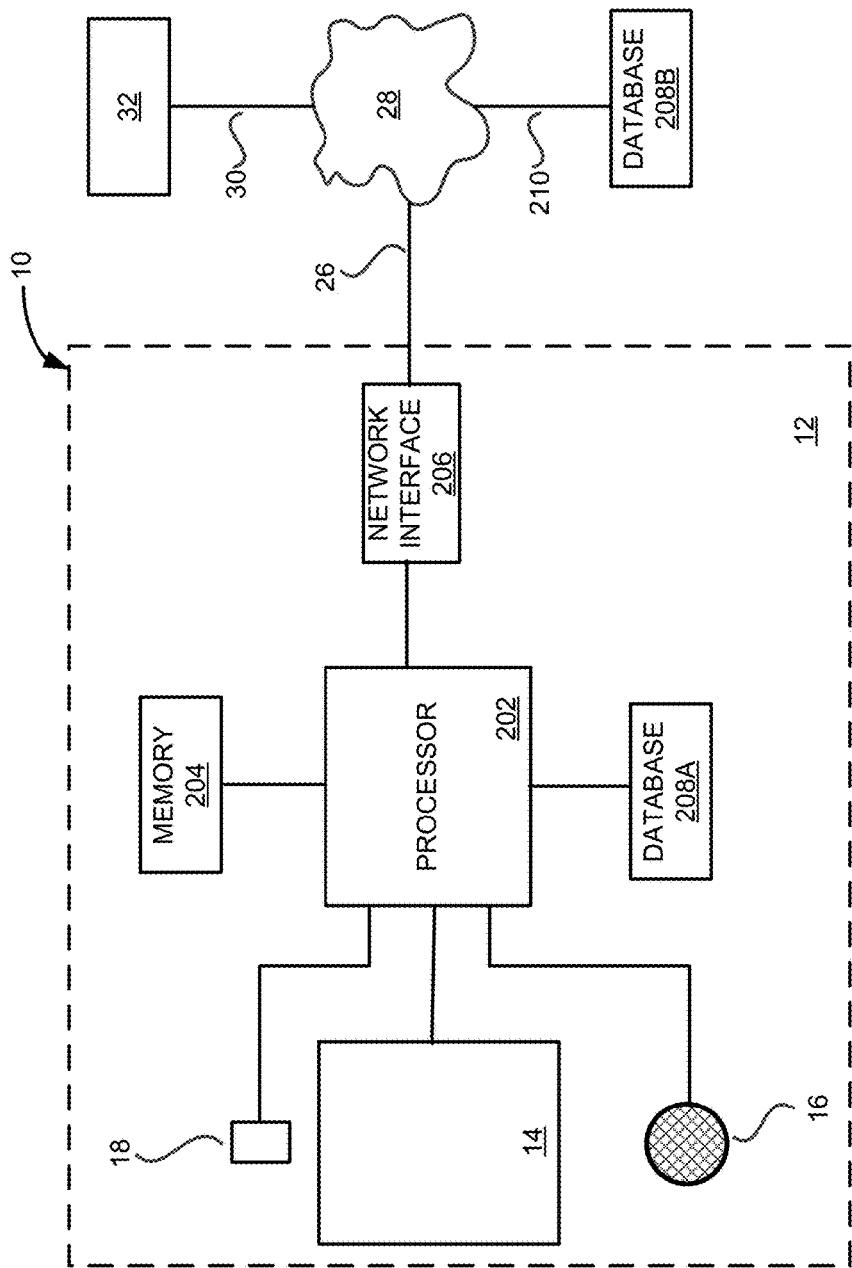
FIG. 2 is a block diagram of one exemplary embodiment of a virtual bulletin board.

FIG. 2 is a block diagram of one exemplary embodiment of the virtual bulletin board 12. This exemplary virtual bulletin board 12 has the display 14, and/or the speaker 16, and the sensor 18. In addition, this exemplary virtual bulletin board 12 has a processor 202, a memory 204, a network interface 206 to provide for communications over the communication link 26, a first (e.g., local) database 208A and/or a second (e.g., remote) database 208B which may be accessed via communication link 210. The memory 204 contains operating instructions for the processor 202, may contain the data for the announcement, and may also include the database 208A.

In operation, the processor 202 reads the announcement information from the memory 204, sends the visible portion of the announcement to the display 14, and/or sends the audible portion of the announcement to the speaker 16. The sensor 18 scans for one or badges 22. If a badge 22 is detected the sensor 18 reads the badge identification information and sends the badge identification information to the processor 202. The processor 202 accesses the database 208A and/or the database 208B, and uses the badge identification information to retrieve at least one corresponding virtual address. The processor sends information regarding that announcement to at least one virtual address, such as, for example, sending an email message, using an email address of the user, with a calendar item (which may be or include a calendar invitation) and/or announcement information to the user's computer 32, as previously mentioned.

The processor 202 may rotate some or all of the various announcements so as to cause different announcements to be presented at different times and/or to be scrolled across the display 14. The processor 202 knows what announcement is being presented and therefore knows what calendar item or announcement information should be sent via the email message. Announcements which are being scrolled may be presented separately, with a brief transition roll between two consecutive announcements. Announcements which are being scrolled may also be presented continuously, with a new announcement rolling up (or rolling down, or rolling from left to right, or rolling from right to left, or using fading-in/out) to replace the previous announcement. The amount of time each announcement is presented may be the same for all announcements, or different announcements may be presented for different periods of time. Further, the time when an announcement is presented may be controlled. For example, weather announcements may be presented on the hour, traffic announcements may be presented every fifteen minutes, an event announcement may be presented at 5, 15, 25, etc., minutes after the hour, etc. Also, when announcements are being scrolled, such that parts of two different announcements are being presented at the same time, the determination as to which announcement is the relevant one when a badge is presented may be based upon the degree of replacement of the old announcement by the new announcement. For example, the threshold may be 50%, or may be 75%, or may be some other desired threshold. Further, the threshold for up/down scrolling may be different than the threshold for left/right scrolling, which may be different than the threshold for fading in/out. Thus, the time when a badge is presented may be correlated to the presentation of the announcement so that the proper information or calendar item may be sent.

Figure 3:
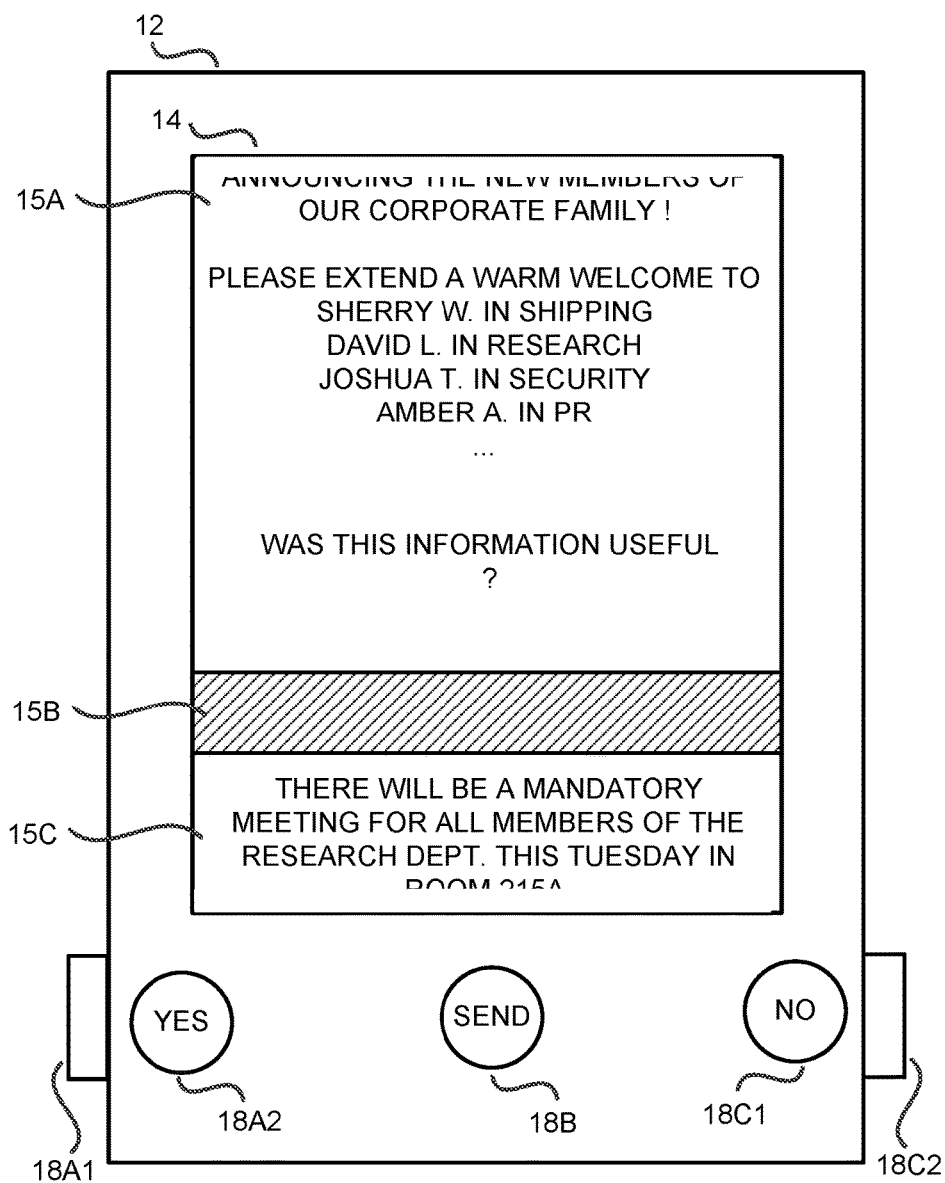
FIG. 3 is a block diagram of another exemplary embodiment of a virtual bulletin board.

FIG. 3 is a block diagram of another exemplary embodiment of a virtual bulletin board 12. In this embodiment the virtual bulletin board has more than one sensor 18, for example, sensors 18A, 18B and 18C are shown. Multiple sensors 18 provide for additional features and user options. For example, one sensor 18A1 or 18A2 may signify "Yes" in answer to a question posed on the display 14, another sensor 18C1 or 18C2 may signify "No" in answer to the question, and another sensor 18B may provide for a different answer, e.g., "Maybe" or initiate an action, e.g., "Send."

Consider the announcement 15A, which has been presented on the display 14 and is now being scrolled off the display 14, as suggested by the top parts of the words "ANNOUNCING THE NEW MEMBERS OF" being cut off on the display 14. Another announcement 15C is being scrolled onto the display 14, as suggested by the bottom parts of the words "ROOM 215A" being cut off on the display 14. Preferably, and optionally, but not necessarily, a border area 15B separate the two displays for clarity of presentation to the user 24. Assume first that only announcement 15A was being displayed, and that there are three sensors 18A2, 18B, and 18C1. The announcement asks whether the information presented was useful. The user 24 might present the badge 22 over the "YES" sensor 18A2 or, if the user 24 does not see any use or benefit from knowing the information displayed, the user 24 might present the badge 22 over the "NO" sensor 18C1. In addition, or alternatively, the user 24 might want to have this information for future reference, so the user 24 might present the badge 22 over the "SEND" sensor 18B, in which case the VBBS 10 would send the announcement, or some information contained in the announcement, to the user 24. The addition of additional sensors 18, in addition to just a "SEND" sensor, allows for fast and convenient user feedback to a sponsor of the announcement. Thus, polling of users 24 is provided. This allows the sponsor(s) to determine what kind of information, and what kinds of formats, are preferred by the users 24 so that both the user 24 and the sponsor(s) obtain the maximum benefit from display of the announcement.

A sensor 18 need not be on a side of a bulletin board, as shown for sensors 18A1 and 18C2, but may be mounted behind, in front of, or within the display 14, as shown for sensors 18A2, 18B, and 18C1, provided that if a sensor is behind the display 14 then the display 14 is made of a material, or has one or more openings, so that the sensor 18A2 can detect and read the badge 22 from behind the display 14. The sensors 18 are preferably separated vertically and/or horizontally by a sufficient distance such that a badge 22 will not simultaneously be detected by two sensors 18.

A sensor 18 is not limited to detecting and reading badges 22. For example, a sensor 18 might be a proximity detector to detect the presence of a person near the VBBS 10. When a person is approaching or is near the VBBS 10 the sensor 18 reports that information to the controller 202, which turns on the display 14. If no one is approaching or near the VBBS 10 then, preferably after a short delay, the controller 202 will turn off the display 14. This provides for energy savings, reduces light and/or sound pollution (i.e., when there is no one present for the announcement), and may extend the useful lifetime of the display 14.

Although reference has been made herein to scrolling from one announcement to the next announcement, that is merely one form of transitioning between two announcements and is not a limitation. Any desired type of transition may be used. For example, the transition may be an intermediate screen which is interposed between the two announcements. The intermediate screen may have a pattern, if desired, which may be festive or celebratory, and may change depending upon the time of the year. The intermediate screen may also be a blank screen of any desired color, e.g., black, white, green, blue, etc. The intermediate screen may have special effects, such as but not limited to bars, shatter, cross, diamond, checkboard, pixelate, zig-zag, etc. Further, the transition may be immediate, that is, by replacing one announcement with the next announcement without an intermediate screen or special effects.

Figure 4:
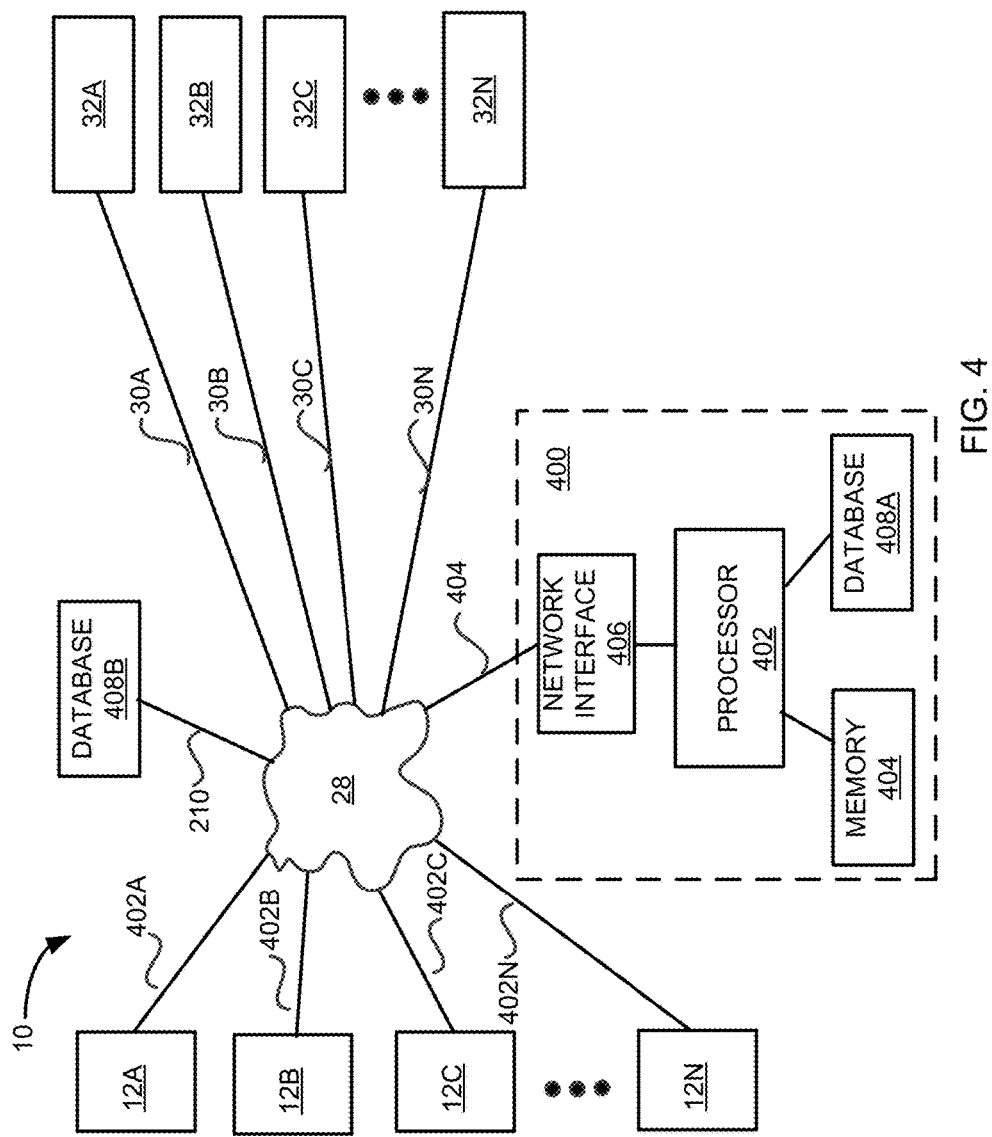
FIG. 4 is a block diagram of another exemplary embodiment of a virtual bulletin board system.

FIG. 4 is a block diagram of another exemplary embodiment of a virtual bulletin board system 10. In this exemplary embodiment there are one or more virtual bulletin boards 12A-12N (which may be referred to as a virtual bulletin board 12 or as virtual bulletin boards 12, depending upon the context of the sentence), a central controller 400, and one or more user computers 32A-32N (which may be referred to as a user computer 32 or as user computers 32, depending upon the context of the sentence). The virtual bulletin boards 12, the central controller 400, the user computers 32, and the optional remote database 408B are all connected via the network 28, such as the Internet, and communication links 30A-30N, 210, 402A-402N, and 404, as shown.

The central controller 400 has a processor 402, a memory 404, a network interface 406 to provide for communications over communication link 404, and a first (e.g., local) database 408A and/or a second (e.g., remote) database 408B. The memory 404 contains operating instructions for the processor 402, preferably contains data related to one or more announcements, and may also include the database 408A. The announcement information may be contained in one or more of memory 404, database 408A, and database 408B.

In one implementation, the processor 402 retrieves announcement information from, for example, the memory 404 and sends the announcement information to the virtual bulletin boards 12, receives identification information for badges 22 from the virtual bulletin boards 12, accesses the database 408A and/or 408B to determine the virtual address registered for the identification information for each badge 22, and sends a calendar item and/or information about the announcement to the virtual address, for example, via an email message to an email address. It will be appreciated that a user may have more than one virtual address, and more than one email address, and messages may be directed to more than one virtual address. For example, an email message may be directed to only one such email address, or may be delivered to two or more email addresses of the same user, or both an email message and a text message may be sent.

Thus, one person may pass by virtual bulletin board 12A, see and/or hear the announcement, and present his or her badge to the scanner 18. The central controller 400 then sends a calendar item and/or information about the announcement via an email message to that person. Another person may pass by the same virtual bulletin board 12A, see and/or hear the same announcement, and present his or her badge to the scanner 18. The central controller 400 then sends information about the announcement via an email message or a text message to that other person. Yet another person may pass by another virtual bulletin board 12B, see and/or hear the same announcement, and present his or her badge to the scanner 18. The central controller 400 then sends a calendar item and/or information about the announcement via a virtual address of that person. Yet another person may pass by the same virtual bulletin board 12A, see and/or hear a different announcement, and present his or her badge to the scanner 18. The central controller 400 then sends a calendar item and/or information about the different announcement via an email message to that person.

Yet another person may pass by yet another virtual bulletin board 12C, see and/or hear a different announcement, and present his or her badge to the scanner 18. The central controller 400 then sends information about the different announcement via a text message to that person.

The central controller 400 may send the same announcement to all of the virtual bulletin boards 12, may send different announcements to each of, or to one or more of, the virtual bulletin boards 12, may rotate some or all of the various announcements with respect to the bulletin boards 12 so as to cause different announcements to be presented at different times and/or at different locations, may cause announcements to be scrolled across a bulletin board, etc. The central controller 400 records which announcements it sends to which virtual bulletin boards 12, so when a virtual bulletin board 12 returns identification information for a badge, the central controller 400 knows what announcement was being presented on the bulletin board and therefore knows what calendar item or announcement information should be via the email message.

Announcements may be presented separately, with a brief transition between two consecutive announcements. Announcements which are being scrolled may be presented continuously, with a new announcement rolling up (or rolling down, or rolling from left to right, or rolling from right to left, or using fading-in/out) to replace the previous announcement. The amount of time each announcement is presented may be the same for all announcements, or different announcements may be presented for different periods of time. Also, when announcements are being scrolled, such that parts of two different announcements are being presented at the same time, the determination as to which announcement is the relevant one when a badge is presented may be based upon the degree of replacement of the old announcement by the new announcement. For example, the threshold may be 50%, or may be 75%, or may be some other desired threshold. Further, the threshold for up/down scrolling may be different than the threshold for left/right scrolling, which may be different than the threshold for fading in/out. Thus, the time when a badge is presented may be correlated to the presentation of the announcement so that the proper information or calendar item may be sent. Also, during the transition from one announcement to the next, the information from the sensors 18 may be ignored, so that there is no ambiguity as to which announcement the user 24 was responding to.

Thus, multiple virtual bulletin boards 12 may display multiple announcements and send identification information for the scanned badges to the central controller 400, which sends respective calendar items and/or information about the announcement to one or more of the virtual addresses of those respective persons.

In another implementation, each virtual bulletin board 12 may have one or more announcements stored in its own memory and presented in accordance with its own programming instructions rather than presenting an announcement as directed by the central controller 400. In this case, when a virtual bulletin board 12 receives identification information for a badge 22, it sends both the identification information for the badge 22 and at least some indication of the announcement being presented at the time that the identification information for the badge was received by the scanner 18. The central controller 400 accesses the database 408A and/or the database 408B, and uses the identification information for the badge to determine a virtual address of the user 24, and uses the indication of the announcement to determine what calendar items and/or information about the announcement should be sent to that virtual address.

In another implementation, some virtual bulletin boards 12 may be controlled by the central controller 400 and other virtual bulletin boards 12 may have their own respective announcements and programming instructions.

Thus, it will be seen that the announcement presented by the various virtual bulletin boards 12 need not be static, but may be dynamic, and may be changed, and/or constantly changing, in accordance with programming instructions in the various bulletin boards 12 and/or the central controller 400.

It is not a requirement that all of the announcements be presented in any of the above manners. Rather, some announcements may not accommodate the scanning of a badge or cause any action if a badge is scanned. For example, an announcement that Krebs Avenue has been closed indefinitely for construction preferably (but not necessarily) will not result in a calendar item or other information being sent to a virtual address.

Some other announcements, even though having a short lifetime, may still result in information being sent to the user. For example, an announcement that there has been a wreck at Exit 75 off Interstate 10 may result in updates, such as but not limited to a text message, or even an audio or video file or clip, being periodically sent to one or more of the virtual addresses of a user. Also, if the announcement is not related to an event scheduled for a particular date and time, such as but not limited to traffic information, then information regarding the announcement may be sent as a text message instead of, or an addition to, an email message. Whether an email message, a text message, and/or other type of message is sent may be affected by sponsor preference settings and/or user preference settings. For convenience of discussion, only one or two virtual addresses will be mentioned below rather than repeatedly listing and discussing options with respect to each virtual address.

When the processor 202 of a virtual bulletin board 12 or the processor 402 of the central controller 400 receives identification information for a badge, it may first check a respective database 208A/408A and/or 208B/408B for sponsor preferences and/or a user preferences to determine what action should be taken. For example, the sponsor of an announcement may specify that only a calendar item will be sent via the email message, or may specify that only announcement information will be sent via the email message, or may specify that both a calendar item and announcement information will be sent via the email message, or that, as mentioned above, nothing will be sent via an email message. Also, the sponsor may provide a date and time after which email messages will not be sent for an announcement. For example, the sponsor may be presenting a seminar and needs to know how many people will attend in order to reserve an appropriately-sized conference room and refreshments. Thus, the sponsor may specify, for example, that neither a calendar item nor announcement information will be sent after 2:00 PM two days before the seminar occurs, even if the sponsor chooses to let the announcement continue for advertising or publicity purposes. Also, the announcement may advise the viewer: "if you want to receive an invitation to this event please swipe your card", or "if you want to receive a calendar item to remind you of this event, please swipe your badge."

A user may also specify preferences. For example, a user may have two or more email addresses and specify that, during working hours during weekdays, the email messages should go a work email address, and that, otherwise, the email messages should go to a home email address.

When sponsor preferences and user preferences do not conflict then both sets of preferences may be observed. If they conflict, then one set of preferences will control, and conflicts in the other set of preferences will be ignored. For example, a sponsor may specify that a calendar item or announcement information may only be sent to a work email address, so the user's preference for use of a home email address will not be observed. Whether an email address is a work email address or a home email address may be determined by, for example, looking at domain of the email address. As another example, if the sponsor preference is for an email message, but the user has only registered a text message address, then the announcement information may be sent to the text message address instead of an email address.

The announcement information may be loaded into the memory, such as but not limited to memory 204 or 404, by any convenient means. For example, a person may access the VBBS 10 via links 26 and 30 and network 28, log in using a username, a password, and any other desired security measures, and upload an announcement, modify an existing announcement, or delete an existing announcement. As another example, a person may go the VBBS 10, insert a USB drive, CD, DVD, or other media and, after entering a username, a password, and any other desired security measures, upload announcement information from the media to the memory 204 or 404, modify an existing announcement, or delete an existing announcement. In this example, there would preferably be a keyboard, USB access port, CD or DVD drive, etc. (not shown) to accommodate the person uploading, modifying, or deleting the announcement information.

Although the central controller 400 is shown as being separate from the various bulletin boards 12A-12N, the central controller 400 could also be included as part of one of the bulletin boards 12A-12N.

Figure 5:
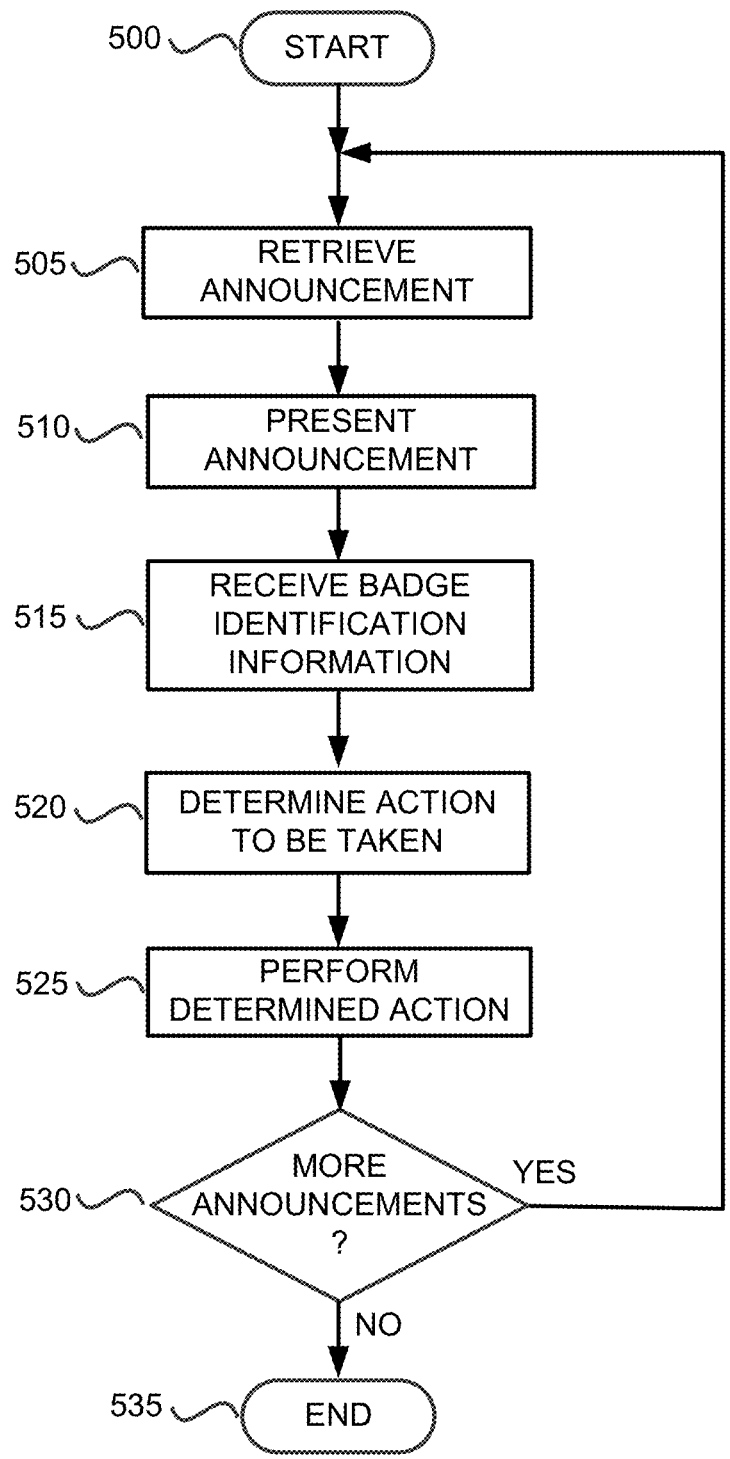
FIG. 5 is a flow chart of an exemplary method of operation of a virtual bulletin board.

FIG. 5 is a flow chart of an exemplary method of operation of a virtual bulletin board 10. Upon starting 500 the processor 202 retrieves 505 an announcement from, for example, the memory 204, the database 208A, and/or the database 208B. The display 14 and/or speaker 16 then present 510 the announcement. The sensor 18 then receives 515 badge identification information from the sensor 18 for a badge 22 which was presented by the user 24 to the virtual bulletin board 10, that is, presented to sensor 18. The processor 202 then consults the memory 204, the database 208A, and/or the database 208B to determine 520 the action to be taken and, if appropriate, an email address for the user 24. For example, the action may be determined based on the badge identification information, the announcement being presented, the sponsor preferences, and/or the user preferences. The processor 202 then performs 525 the determined action such as, for example, sending a calendar item for the announcement to an email address of the user via the network interface 206, sending information regarding the announcement to an email address of the user via the network interface 206, etc.

The processor 202 then determines 530 whether there are more announcements to be presented. For example, announcements may be presented until a predetermined time, such as the end of a business day. As another example, announcements may be presented until they have been presented a certain number of times, and then another set of announcements will be presented. If no more announcements are to be presented, then the process may end 535. If announcements should continue to be presented, then a return is made to step 505.

Figure 6:
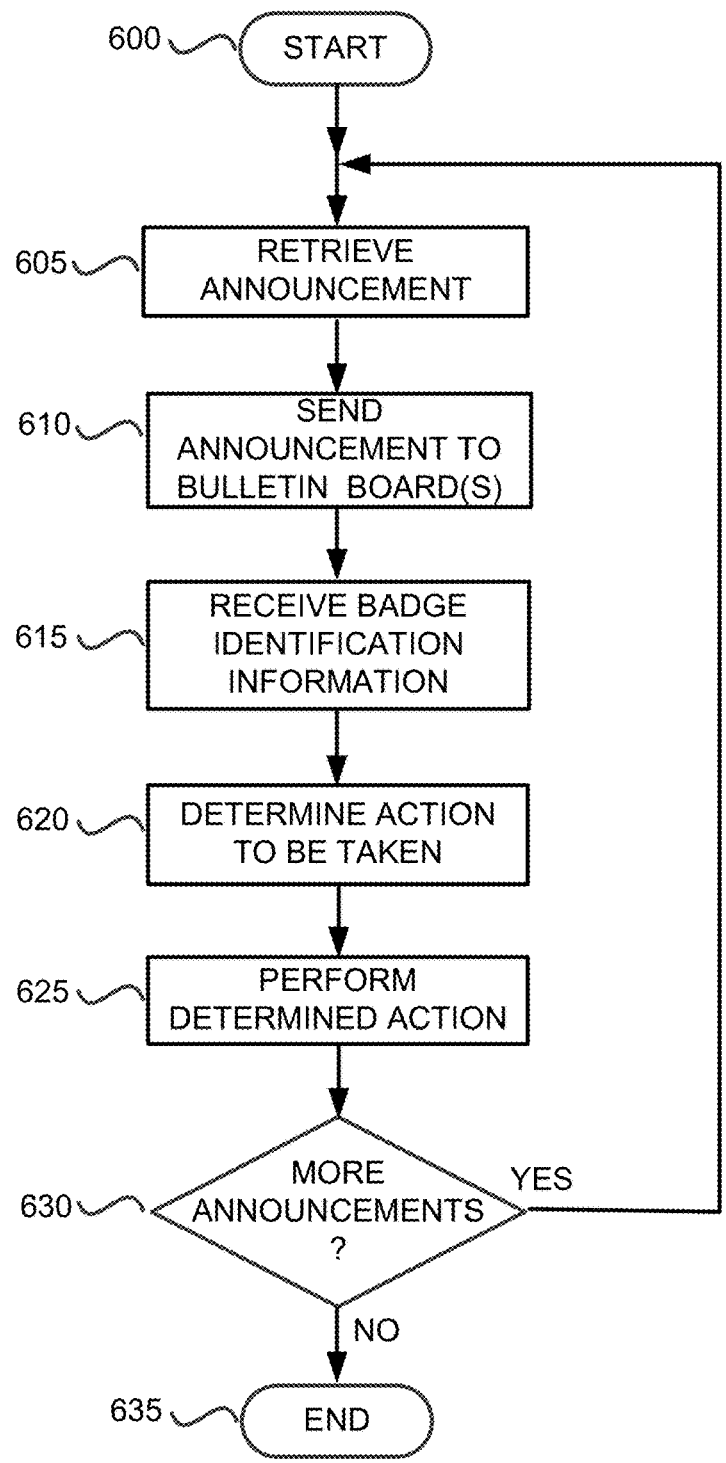
FIG. 6 is a flow chart of an exemplary method of operation of a central controller of a virtual bulletin board system.

FIG. 6 is a flow chart of an exemplary method of operation of a central controller 300 of a virtual bulletin board system 10. Upon starting 600 the processor 302 of the central controller 300 retrieves 405 an announcement from, for example, the memory 304, the database 308A, and/or the database 308B. The processor 302 then sends 610 the announcement to one or more of the bulletin boards 10 for presentation. The processor 302 then receives 615 badge identification information from a bulletin board 10 for a badge 22 which was presented by the user 24 to the virtual bulletin board 10. The processor 302 then consults the memory 304, the database 308A, and/or the database 308B to determine 620 the action to be taken and, if appropriate, an email address for the user 24. For example, the action may be determined based on the badge identification information, the announcement being presented, the sponsor preferences, and/or the user preferences. The processor 302 then performs 625 the determined action such as, for example, sending a calendar item for the announcement to an email address of the user via the network interface 306, sending information regarding the announcement to an email address of the user via the network interface 306, etc.

The processor 302 then determines 630 whether there are more announcements to be presented. If not, then the process may end 635. If so, then a return is made to step 605.

Figure 7:
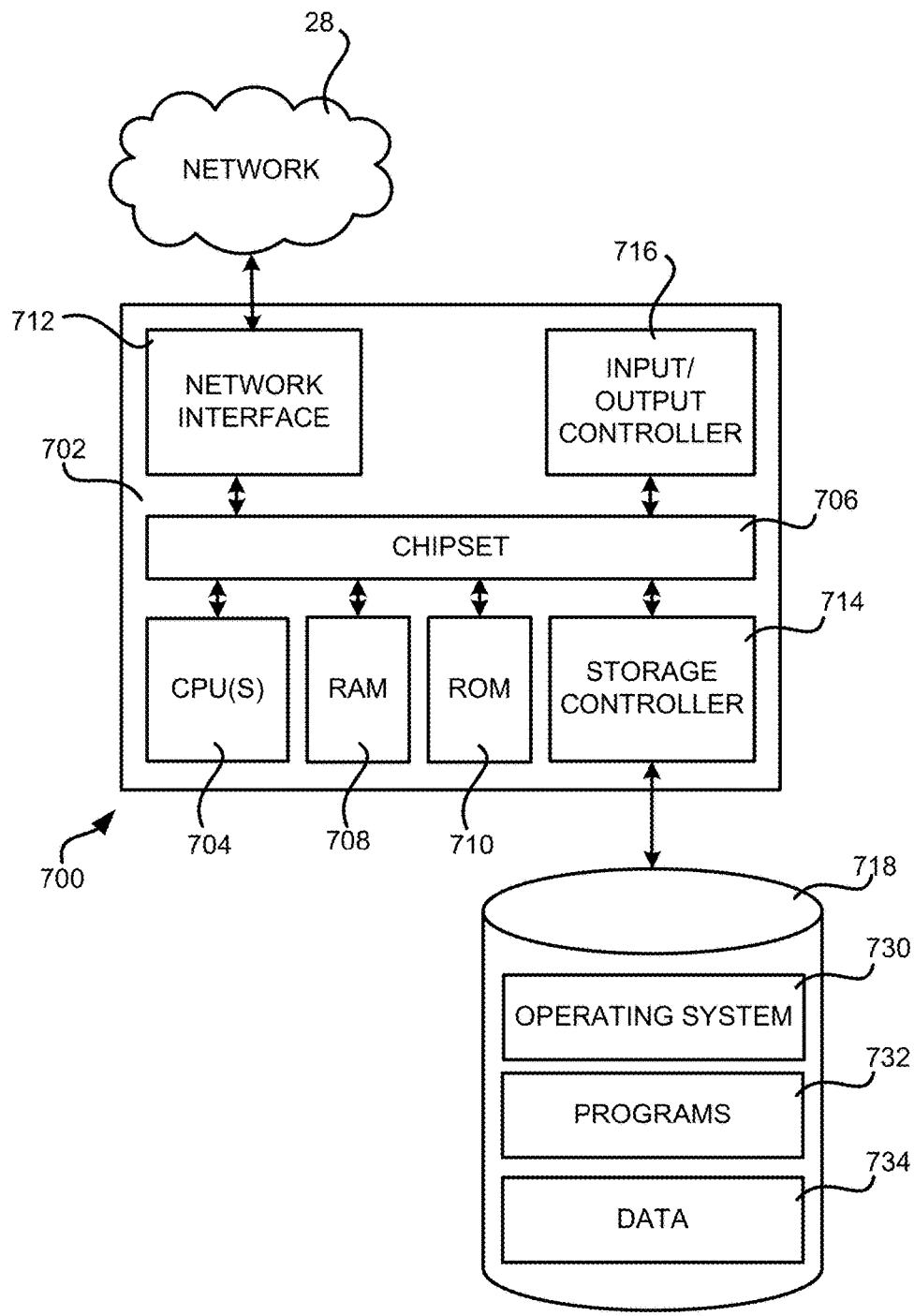
FIG. 7 is a computer architecture diagram showing an illustrative computer hardware architecture for implementing a computing device that might be utilized to implement aspects of the various configurations presented herein.

FIG. 7 is a computer architecture diagram showing an illustrative computer hardware architecture for implementing a computing device that might be utilized to implement aspects of the various configurations presented herein. The computer architecture shown illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPU(s) 704 can be programmable processors that perform arithmetic and logical operations necessary for the operation of the computer 700.

The CPU(s) 704 performs operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPU(s) 704 and the remainder of the components and devices on the baseboard 702. The chipset 706 can provide an interface to a random access memory (RAM) 708, used as the main memory in the computer 700. The chipset 706 can further provide an interface to a computer-readable storage medium such as a read-only memory ("ROM") and/or non-volatile RAM ("NVRAM") 710 for storing basic routines that help to startup the computer 700 and to transfer information between the various components and devices. The ROM or NVRAM 710 can also store other software components for operating the computer 700 in accordance with the configurations described herein.

The computer 700 can operate in a networked environment using logical connections to remote computing devices and computer systems through a network, such as the network 28. The chipset 706 can include functionality for providing network connectivity through a network interface 712 (206, 406), such as a network interface card or controller (NIC), such as a gigabit Ethernet adapter, is capable of connecting the computer 700 to other computing devices over the network 28. It should be appreciated that multiple network interfaces 712 can be present in the computer 700, connecting the computer to other types of networks and remote computer systems.

The computer 700 can be connected to a mass storage device 718 (204, 404) that provides non-volatile storage for the computer. The mass storage device 718 can store an operating system 730, programs 732, and data 734, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on, modify data on, and retrieve data from, the mass storage device 718, and the databases 208A, 208B, 408A, 408B, by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 730 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPU(s) 704 transition between states, as described above. According to one configuration, the computer 700 has access to computer-readable storage media storing computer-executable instructions which, when executed by the computer 700, perform the various processes described above. The computer 700 might also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules or instructions that execute on one or more computing devices, those skilled in the art will recognize that other implementations can be performed in combination with other types of program modules and/or instructions. Generally, program modules include routines, programs, components, data structures, instructions, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The configurations described herein can be practiced in distributed computing environments, where various tasks can be performed by various remote computing devices that are linked through a communications network. In a distributed computing environment, program modules can be located in both local and remote memory storage devices.

Based on the foregoing, it should be appreciated that technologies for providing a virtual bulletin board system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method of operating a bulletin board system, comprising: sending an announcement to a bulletin board for presentation at a predetermined time, the bulletin board being non-transitory;
no later than at a predetermined ending time, sending an instruction to the bulletin board to stop presenting the announcement;
receiving, from the bulletin board, identification information of a badge presented to the bulletin board during presentation of the announcement;
accessing a database to determine a sponsor preference regarding an expiration time, the expiration time being a time after which a calendar item regarding the announcement will not be sent;
determining that the expiration time has not elapsed;
accessing a database to determine a preferred virtual address from at least one of a sponsor preference or a user preference and corresponding to the identification information of the badge; and
sending a calendar item regarding the announcement to the preferred virtual address;
wherein the badge is one of a radio frequency identification (RFID) card, an EMV card, a card having at least a bar code, a card having at least a Quick Read (QR) code, a card having an optically-readable code, a smart phone which can display at least one of a bar code, a QR code, or an optically-readable code, a device which can display at least one of a bar code, a QR code, or an optically-readable code, a room key, a room card, a fingerprint of a user, or a face of a user.

2. The method of claim 1 wherein:
the virtual address is at least one of an email address or a telephone number.

3. The method of claim 1 wherein:
the announcement is concerning an event;
the calendar item contains information regarding the event; and
sending the calendar item to the preferred virtual address comprises sending the calendar item to an email address.

4. The method of claim 1 wherein:
the announcement is concerning an event;
the calendar item contains information regarding the event; and
sending the calendar item to the preferred virtual address comprises sending the calendar item as a text message to a telephone number.

5. A method of operating a bulletin board, comprising:
causing an announcement to be presented on a bulletin board at a predetermined starting time, the bulletin board being non-transitory;
causing presentation of the announcement to be ended at a predetermined ending time;
receiving identification information for a badge presented to the bulletin board during presentation of the announcement;
accessing a database to determine a sponsor preference regarding an expiration time, the expiration time being a time after which a calendar item regarding the announcement will not be sent;
determining that the expiration time has not elapsed;
accessing a database to determine a preferred virtual address from at least one of a sponsor preference or a user preference and corresponding to the identification information of the badge;
accessing a database to determine an action to be taken based at least partially upon the identification information, wherein the action comprises to send at least the calendar item regarding the announcement to the preferred virtual address; and
executing the action;
wherein the badge is one of a radio frequency identification (RFID) card, an EMV card, a card having at least a bar code, a card having at least a Quick Read (QR) code, a card having an optically-readable code, a smart phone which can display at least one of a bar code, a QR code, or an optically-readable code, a device which can display at least one of a bar code, a QR code, or an optically-readable code, a room key, a room card, a fingerprint of a user, or a face of a user.

6. The method of claim 5 wherein the announcement comprises at least one of a visual image or an audible sound.

7. The method of claim 5 wherein:
the announcement is related to an event;
the calendar item contains information regarding the event; and
the database contains at least one virtual address corresponding to the identification information; and
the action is to send the calendar item to the at least one virtual address.

8. The method of claim 5 wherein causing the announcement to be presented comprises:
sending the announcement for presentation by a presentation device of the bulletin board; and
sending information regarding the predetermined starting time to the bulletin board.

9. The method of claim 5 wherein the database comprises a sponsor preference regarding the action.

10. The method of claim 5:
wherein the announcement is related to an event;
wherein the database contains a plurality of virtual addresses corresponding to the identification information, and a sponsor preference regarding a virtual address to be used regarding the action; and further comprising:
  determining the sponsor preference regarding the virtual address to be used to provide a preferred virtual address; and
  the action is to send at least the calendar item regarding the announcement to the preferred virtual address.

11. The method of claim 5:
  wherein the announcement is related to an event;
  wherein the database contains a plurality of virtual addresses corresponding to the identification information, and a user preference regarding a virtual address to be used regarding the action; and further comprising:
  determining the user preference regarding the virtual address to be used to provide a preferred virtual address; and
  the action is to send at least the calendar item regarding the announcement to the preferred virtual address.

12. The method of claim 5:
  wherein the announcement is of a type, the type being one type of a plurality of types;
  wherein the database contains a plurality of virtual addresses corresponding to the identification information, and a preference regarding a virtual address to be used based upon a type of an announcement; and
  further comprising:
  determining the type of the announcement;
  determining the virtual address to be used based upon the type of the announcement to provide a preferred virtual address; and
  the action is to send information regarding the announcement to the preferred virtual address.

13. A bulletin board system, comprising:
  a bulletin board comprising a presentation device and a sensor, the presentation device to present a first announcement during a first predetermined time period and a second announcement during a second predetermined time period, the sensor to receive identification information from a badge presented to the bulletin board during at least one of the first predetermined time period or the second predetermined time period;
  wherein the sensor is at least one of a radio frequency identification (RFID) reader, an optical scanner, an EMV card reader, a biometric scanner, a fingerprint scanner, or a facial recognition system;
  wherein the badge is one of an RFID card, an EMV card, a card having at least a bar code, a card having at least a Quick Read (QR) code, a card having an optically-readable code, a smart phone which can display at least one of a barcode, a QR code, or an optically-readable code, a device which can display at least one of a bar code, a QR code, or an optically-readable code, a room key, a room card, a fingerprint of a user, or a face of a user;
  a database specifying a first action to be taken with respect to the first announcement and a second action to be taken with respect to the second announcement; and
  a processor, connected to the bulletin board, to the database, and to a memory containing operating instructions for the processor, the database being either part of the memory or separate from the memory, the processor executing the operating instructions to:
  receive, from the bulletin board, the identification information;
  determine that the badge was presented to the bulletin board during presentation of the first announcement;
  determine a sponsor preference regarding an expiration time with respect to the first announcement, the expiration time being a time after which a calendar item regarding the first announcement will not be sent;
  determine that the expiration time has not elapsed;
  access the database to determine the first action to be taken, the first action being based at least partially on the identification information, the action being to send at least the calendar item regarding the first announcement to the preferred virtual address from at least one of a sponsor preference or a user preference and corresponding to the identification information of the badge; and execute the first action.

14. The bulletin board system of claim 13 wherein:
  the first announcement is related to a first event;
  the database contains at least one virtual address corresponding to the identification information of the badge; and
  the first action is to send the calendar item regarding the first announcement to the at least one virtual address.

15. The bulletin board system of claim 14 wherein the at least one virtual address is an email address, and action is to send the calendar item regarding the first announcement to the email address.

16. The bulletin board system of claim 13 wherein the badge is a radio frequency identification (RFID) badge.

17. The bulletin board system of claim 13 wherein the processor further executes the operating instructions to:
  send, prior to the first predetermined time period, the first announcement to the bulletin board for presentation by the presentation device during the first predetermined time period, and send, prior to the second predetermined time period, the second announcement to the bulletin board for presentation by the presentation device during the second predetermined time period.

18. The bulletin board system of claim 13 wherein the presentation device presents at least one of a visual image or an audible sound.

19. The bulletin board system of claim 13,
  wherein the bulletin board is a first bulletin board, the presentation device is a first presentation device, and the sensor is a first sensor; and further comprising:
  a second bulletin board, the second bulletin board comprising a second presentation device and a second sensor, the second presentation device to present a third announcement during a third predetermined time period, the third predetermined time period having a third starting time and a third ending time, the second sensor to receive third identification information from a third badge during presentation of the third announcement; and
  wherein the database further specifies a third action to be taken with respect to the third announcement;
  wherein the processor is also connected to the second bulletin board, and further executes the operating instructions to:
  receive the third identification information from the second bulletin board;
  determine an expiration time with respect to the third announcement, the expiration time being a time after which a calendar item regarding the third announcement will not be sent;
  determine that the expiration time has elapsed;
  access the database to determine the third action to be taken, the first action being based at least partially on the third announcement, the third identification information received from the second bulletin board, and that the expiration time has elapsed; and execute the third action, wherein the third action includes sending information regarding the third announcement but does not include sending a calendar item regarding the third announcement; and wherein the third announcement may be different than the first announcement and the second announcement or may be the same as the first announcement or the second announcement.

20. The bulletin board system of claim 13 wherein the processor further executes the operating instructions to:
   transition from presentation of the first announcement to presentation of the second announcement by scrolling the first announcement off the presentation device while scrolling the second announcement onto the presentation device;
   determine a degree of replacement of the first announcement by the second announcement; and
   determine that the first announcement was being presented when the badge was presented to the bulletin board by determining that the degree of replacement was less than a threshold amount.

\* \* \* \* \*